Jan. 27, 1953

G. J. ALLES 2,626,856

GAS-SOLID EXTRUSION REACTOR

Filed June 22, 1948

INVENTOR.
GEORGE J. ALLES
BY
Thomas R. O'Malley

Patented Jan. 27, 1953

2,626,856

UNITED STATES PATENT OFFICE 2,626,856

GAS-SOLID EXTRUSION REACTOR

George J. Ailes, Fredericksburg, Va., assignor to American Viscose Corporation, Wilmington, Del., a corporation of Delaware Application June 22, 1948, Serial No. 34,532

5 Claims. (Cl. 23—284)

This invention relates to an apparatus and a method of continuously treating solid materials, particularly those whose treatment involves the presence of gases or volatile liquids which are preferably confined in the region in which the treatment is conducted.

The processing of many solid materials is accompanied by the evolution of gases or volatile components which may be objectionable in the atmosphere occupied by workmen. Confinement of such gases, vapors, or liquids to the treatment zone may be necessary to obtain proper control of the reaction desired, or it may be economical to prevent the escape of said gases and vapors so that they may be reclaimed or their loss minimized. Usually such processes are carried out by batch type operations within sealed vessels. The modern trend, however, is to avoid batch processing and where possible, to accomplish manufacturing processes in a continuous manner. For example, the conventional method of preparing cellulose xanthate from alkali cellulose in the manufacturing of viscose rayon, or in the esterification or etherification of cellulose to produce rayon filaments from solutions of cellulose esters or ethers, has been principally by batch processing. However, on account of the production efficiencies, reduction in labor costs, and the more accurate control over processing generally obtainable by continuous treatment, a continuous method and apparatus is desirable in processing solid raw materials which are subjected to gaseous or volatile liquid materials, particularly in the rayon industry for obtaining the products named.

It is therefore an object of the present invention to provide a method, and closed or sealed apparatus, for continuously treating and/or chemically converting solid materials. It is another object to provide an apparatus into which metered amounts of raw materials may be accurately introduced and efficiently mixed while the materials or a mixture thereof is continuously carried through the apparatus. It is still another object to provide apparatus which is mechanically simple, easily designed and constructed, easily maintained, and economical to operate. Other objects, features and advantages of the invention will become obvious in the following description of the invention and the drawing relating thereto.

In the drawing illustrative of the invention:

The invention comprises introducing a solid material into a cylindrical walled vessel containing a screw or helicoid flight conveyor of variable pitch and subjecting the material to a processing treatment while conveying it through the vessel. The pitch of the helical turns of the conveyor is less near the ends of the container than in the intermediate portion wherein treating of the material is effected. By this arrangement, compression of materials is obtained in the closer spaced helices of the conveyor near the ends of the chamber to cause packing of the material and thereby a sealing effect.

Figures 1, 2, 3:
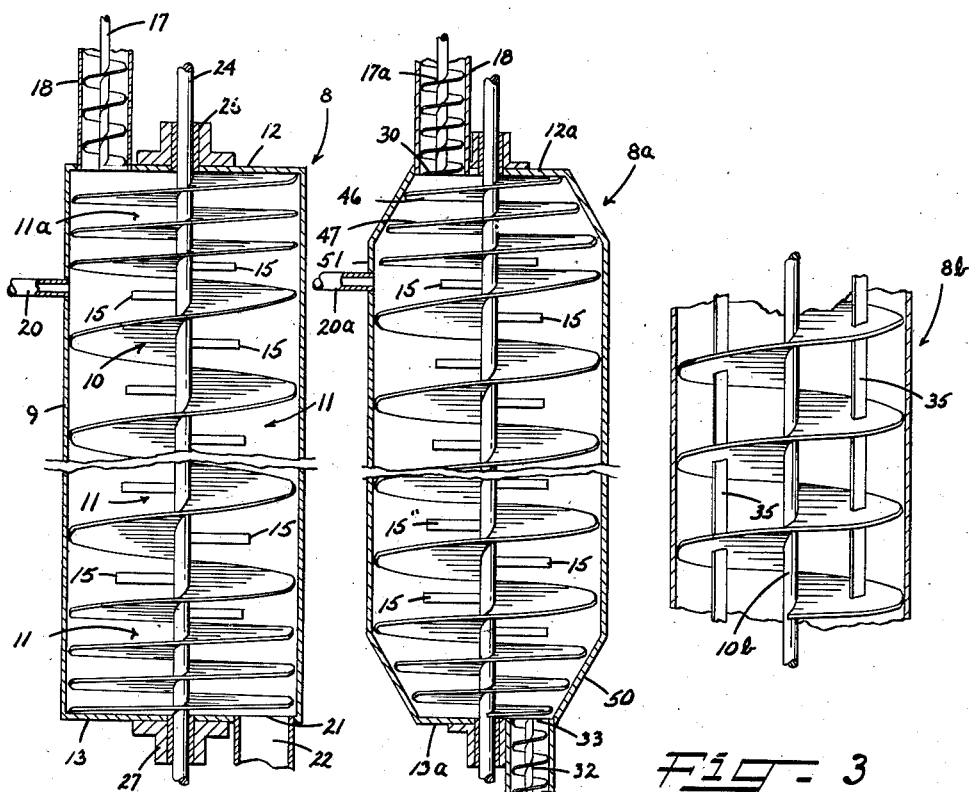
Fig. 1 is a view in section of one embodiment of the invention along the axis of the principal rotatable element thereof.
Fig. 2 is a similar sectional view of a modification of the apparatus shown in Fig. 1.
Fig. 3 is a fragmentary axial section of still another modification.

Fig. 1 illustrates an embodiment of the invention wherein a vessel 8 is horizontal and cylindrical from end to end and houses a cylindrical screw conveyor 10 which fits with small clearances within the interior surfaces of the annular wall 9 and the end walls 12 and 13 of the vessel 8. The pitch of the turns comprising each of the end portions 11a and 11b of the conveyor 10 is progressively smaller than that of the intermediate portion 11. The term "turn" generally describes a helical section of the conveyor which advances through an angle of 360 degrees about the axis of the conveyor. End portions 11a and 11b may be similarly pitched as shown in the drawing or they may be dissimilarly pitched according to the needs of a particular process such as that wherein there is radical change in volume of the raw materials entering and the products leaving the vessel. In the intermediate region 11 of the chamber wherein a substantial portion of the treatment or conversion of materials takes place, the conveyor 10 is provided with agitator elements 15 to facilitate the separation of the solid material and the penetration thereof by liquid or gaseous addition. The conveyor is supported at each end of the chamber 8 by extension of a shaft 24 through bearings 26 and 27 fixed to walls 12 and 13 respectively. Solid material may be introduced into the chamber by means of another smaller conveyor 17 operating within the casing 18 attached to wall 12. Reactants or other liquid or gaseous raw materials may be introduced into the intermediate region of the chamber 8 by duct means such as the tube 20. During operation, the material will be carried toward the end wall 13 and be discharged through an aperture 21 and a duct means such as a tube 22 attached to wall 13.

The apparatus illustrated in Fig. 2 is quite similar except for the frusto-conical taper provided in the chamber 8a extending around the end portions of the conveyor 10a. The pitch of the screw is diminished with the diminution of the taper of the outer casing of the chamber as the end walls 12a and 13a are approached from an intermediate region. This is an important difference from the previous embodiment, however, since by decreasing the diameter of the screw and of the encompassing walls of the chamber while also decreasing the pitch of the screw the packing effect at the ends of the conveyor is substantially increased over the simple cylindrical design shown in Fig. 1. The smaller conveyor 17a operating within the casing 18 may be used to charge the larger chamber 8a. The effectiveness of the seal in opposing the pressure built up within the chamber 8a may be controlled very efficiently by regulating the speed of conveyor 17a relative to the speed of the larger conveyor 10b. For example, intense packing action and therefore highly effective sealing of the charge end of the vessel 8a may be obtained by rotating the conveyor 17a to produce a higher delivery rate to the aperture 30 in the end wall 12a than the normal capacity of conveyor 10a for removing material from the aperture. The relative speeds of conveyor 17a and 10a may be regulated in any ratio which accomplishes efficient charging of different types of solid materials. For example, solid materials which pack or compress easily may be delivered to the chamber 8a at faster rates than dense materials that pack less readily. The conveyor 17 for feeding the apparatus, and the conveyor 10 of Fig. 1 may be operated in a similar manner to seal the vessel 8.

Fig. 2 illustrates also another small conveyor 32 provided at the discharge end of vessel 8a extending contiguously from an aperture 33 through the end wall 13a. This conveyor may be used as a means for controlling the sealing of the vessel 8a at the point where the material is discharged. Here again, as with the charging conveyor 17a, sealing may be controlled by the relative speeds of the conveyor 10a and 32. To implement sealing at the discharge end of the vessel 8a in the handling of materials which pack readily and are fluffy or loose, it is desirable to operate the conveyor 32 at a slower rate than the normal delivery rate of the conveyor 10a so as to restrict the discharge of material through the aperture 33 and thus produce increased packing in the helices of the conveyor 10a nearest the wall 13a. The conveyor 32, however, must not be operated at such a slow speed as would restrict the discharge of material from the chamber to a rate which would cause the vessel 8a to become unduly loaded. In this manner, therefore, the relative speeds of conveyors 10a, 17a and 32 may be varied to obtain the packing of materials being charged into and discharged from the vessel 10a for efficient sealing of the vessel during a processing operation according to the invention. As in the apparatus of Fig. 1, the apparatus of Fig. 2 is provided with agitator elements 15a secured to the conveyor 10a which promote mixing and disintegration of comminuted materials being carried lengthwise of the reaction region of the chamber 8a. A tube 20a is provided for the charging of gaseous or liquid materials into the intermediate region or reaction zone of the vessel 8a.

Fig. 3 represents a section of the reaction zone of apparatus such as described in Figs. 1 and 2. This apparatus differs from that of earlier figures by being provided with agitator elements 35 of a different design. These elements 35 extend between successive conveyor helices in a direction substantially parallel to the axis of the conveyor. Although illustrated as flat bar-like members, the flatter sides of which extend radially from the conveyor axis, such elements may be provided in any size, shape, or cross section desired, and at any radius from the axis of the conveyor considered desirable. Agitator elements of this type will be particularly effective when the chamber 8b is positioned with the axis of the conveyor 10b extending in a direction having little or no angularity with the horizontal direction.

Figure 4:
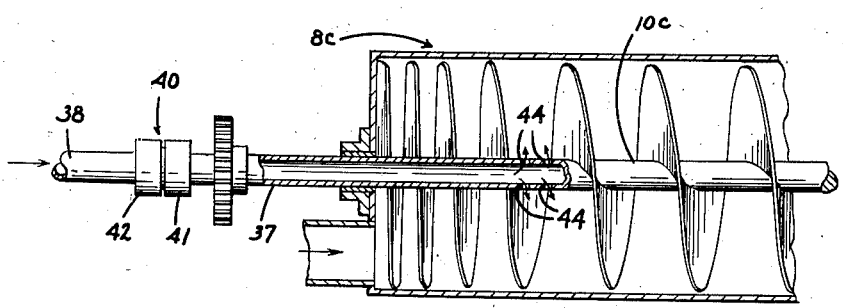
Fig. 4 is a sectional view illustrating apparatus similar to that shown in Fig. 1, illustrating also a tubular material conducting shaft partially sectioned.

Fig. 4 illustrates apparatus similar to that shown in Fig. 1 except that an alternative means is provided for conducting gaseous or liquid materials into the reaction zone of the vessel 8c. Instead of a duct extending through the cylindrical walls of the vessel such as tubes 20 and 20a of Figs. 1 and 2, a hollow conveyor shaft 37 is provided which receives liquid or gaseous materials from a nonrotatable duct or tube 38. The materials flow from the tube 38 through a leak-proof packing gland 40, one member 41 of which is fixed to the shaft 37 and is rotatable with respect to another member 41 fixed to the end of the duct 38. The shaft 37 may be hollow for any distance into the interior of the vessel 8c necessary or desirable in the distribution of materials within the vessel 8c. As shown in Fig. 4, the hollow portion of the shaft 37 may extend merely to the portion of the reaction zone nearest the charging end of the vessel. Apertures 44 extending radially through the walls of the hollow portion of shaft 37, distribute the fluids passing through the shaft into the solid material being transported longitudinally through the vessel 8c by the conveyor 10c. The conveyor 10c may be provided with agitator elements such as elements 15 or 35 of any of the preceding figures.

As one specific application of the apparatus herein shown and described, alkali cellulose in shredded, crumb or exposed fiber state is introduced into a closed cylindrical metal container such as vessel 8a of Fig. 2 by a conveyor 17a. The helices 46 and 47 in the tapered portion of the chamber near its charge end maintain the material in a condensed state to form a seal or plug which prevents escape of liquid or gas from the reaction zone within the intermediate portion of the vessel. To insure sealing of the charging end of the vessel, the conveyor 17a may be operated at sufficient speed to obtain even greater packing of the material before entering the vessel 8a. After material enters the cylindrical portion 51 of the vessel 8a, it is carried along by conveyor helices of greater pitch which in cooperation with agitator elements 15a serve to open up the relatively condensed material. At a point along the cylindrical portion 51 of the vessel 8a near the charge end, carbon disulfide is introduced into the alkali cellulose through the tube 20a and thoroughly agitated and mixed therewith to obtain complete penetration of the carbon disulfide into the alkali cellulose fibers to obtain the proper degree of reaction. A relatively long reaction zone is needed in the apparatus which is shown in the shortened or broken illustrations in Figs. 1 and 2. The reaction zone may be provided in any length necessary to accomplish xanthation according to predetermined conditions of temperature, pressure, fineness of the alkali cellulose material, speed of the conveyor 10b, and other factors influencing the xanthating process. After the materials are conveyed through a reaction zone of adequate length they are carried into the tapered portion 59 of the vessel 8a adjacent to the discharge end of the vessel. The materials as they enter this tapered portion, are compacted both by the taper of the vessel and the conveyor, and the progressively decreasing pitch of the helices of the conveyor 10b. The material, now essentially xanthated cellulose, is discharged through the aperture 33 and carried away from the vessel by the conveyor 32. The speed of rotation of the conveyor 32 may be adjusted to obtain efficient sealing of the vessel 8a.

In the apparatus herein described and illustrated, the auxiliary conveyors such as 17a and 32 included as a part of the apparatus shown in Fig. 2 are merely illustrative of devices which may be used to provide a more efficiently sealed reaction vessel according to the invention. The invention includes any other material handling, or conveying equipment, or such expedients as may be used in feeding compacted materials into a processing vessel such as 8 or 8a of the drawing, or in removing processed materials therefrom in a compacted state to prevent the escape of gases or liquids from the vessel.

The xanthating of alkali cellulose has been described with reference to the embodiment illustrated in Fig. 2 but it may readily be accomplished in apparatus according to any of the other embodiments. The various embodiments may likewise be applied to many other processes in which solids are treated with gases, liquids, or other solids by installation of a suitable device for introducing such treating materials into the reaction zone of the apparatus of the invention. It is obvious that each type of material sought be processed by this apparatus will involve design problems too numerous to cover in a description of the invention. As examples, the materials used in the construction of the apparatus, the length of the reaction zone, the points at which treating materials are introduced, the number of materials and the number of points at which treating materials are to be introduced into the reaction zone, the speed of the conveyor, the speeds at which the charging, and discharging devices are operated relative to the speed of the conveyor, the type of agitator blades, and other such factors are considered in applying the method and apparatus to specific raw materials or products.

While preferred embodiments have been shown it is understood that changes and variations may be made without departing from the spirit and scope of the invention as defined by the appended claims.

I claim:

1. An apparatus for treating substantially solid materials comprising a stationary vessel having a side wall of circular cross section and end walls, a helical conveyor supported rotatably and co- axially within the vessel extending closely to said walls for rotation at close clearance with all portions of the walls, the side wall and the succeeding turns of the conveyor enclosing and defining a series of spaces through which material is continuously transferred, the side wall and the periphery of the conveyor being contoured and the conveyor being pitched to provide some of said spaces in maximum size in an intermediate section of the apparatus and progressively smaller spaces in opposite directions toward the end-walls, an opening through one end-wall for feeding material into the vessel, an opening through the other end-wall for discharging material from the vessel, means for rotating the conveyor in the direction producing transfer of the material from the feed opening to the discharge opening, means for delivering material to the feed opening at a rate greater than the transfer rate of the turns of the conveyor adjacent the end-wall having the feed opening to compact the material entering the vessel into substantially gas impervious condition.

2. Apparatus as defined in claim 1 comprising a series of conveyor turns on at least one side of the intermediate section that have progressively less pitch than the turns of the intermediate section.

3. Apparatus as defined in claim 1 comprising conveyor turns and side-wall portions thereabout on at least one side of the intermediate section which have progressively smaller diameters in a direction toward the respective end-wall than the turns and the side-wall portion of the intermediate section.

4. Apparatus as defined in claim 1 wherein the conveyor comprises a helix mounted on a hollow shaft, said shaft having apertures contiguous with its hollow region along the portion thereof disposed within said intermediate section, and means connected with the shaft exteriorly of the vessel for feeding a fluid through the shaft into said hollow region.

5. Apparatus as defined in claim 1 wherein the means for feeding material to the feed opening is a screw conveyor.

G. J. ALLES.

REFERENCES CITED

The following references are of record in the file of this patent:

UNITED STATES PATENTS

| Number | Name | Date |
|---|---|---|
| 1,408,512 | Jack | Mar. 7, 1922 |
| 1,767,248 | Leach | June 24, 1930 |
| 1,854,731 | Beran | Apr. 19, 1932 |
| 1,920,499 | Flumerfelt | Aug. 1, 1933 |
| 2,122,188 | Vollroth | June 28, 1938 |
| 2,364,392 | Schmitz | Dec. 5, 1944 |
| 2,395,777 | Brunjes et al. | Feb. 26, 1946 |
| 2,494,588 | Skooglund | Jan. 17, 1950 |
| 2,517,339 | Offutt et al. | Aug. 1, 1950 |

FOREIGN PATENTS

| Number | Country | Date |
|---|---|---|
| 696,411 | France | Feb. 14, 1930 |
| 489,768 | Great Britain | Aug. 3, 1938 |